June 15, 1943.     E. J. KARP     2,321,751
POWER TAKE-OFF
Original Filed April 25, 1941
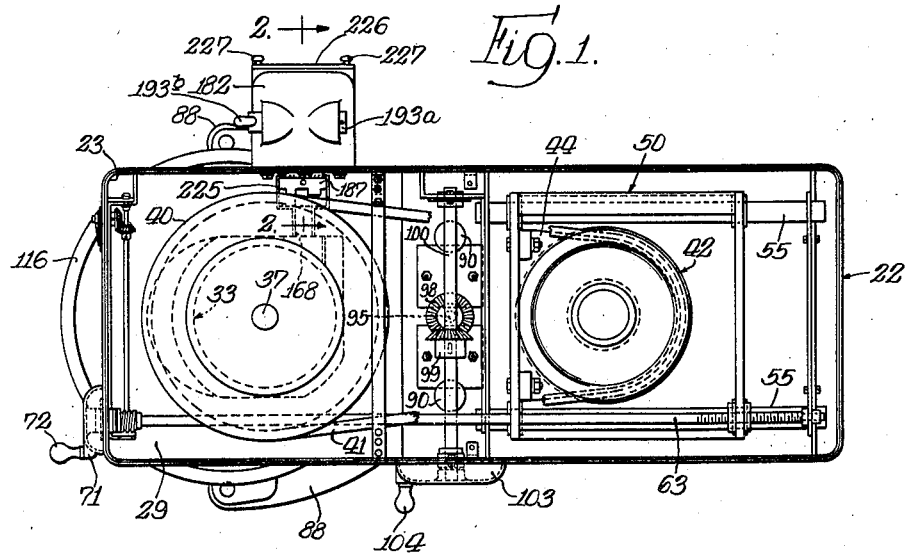
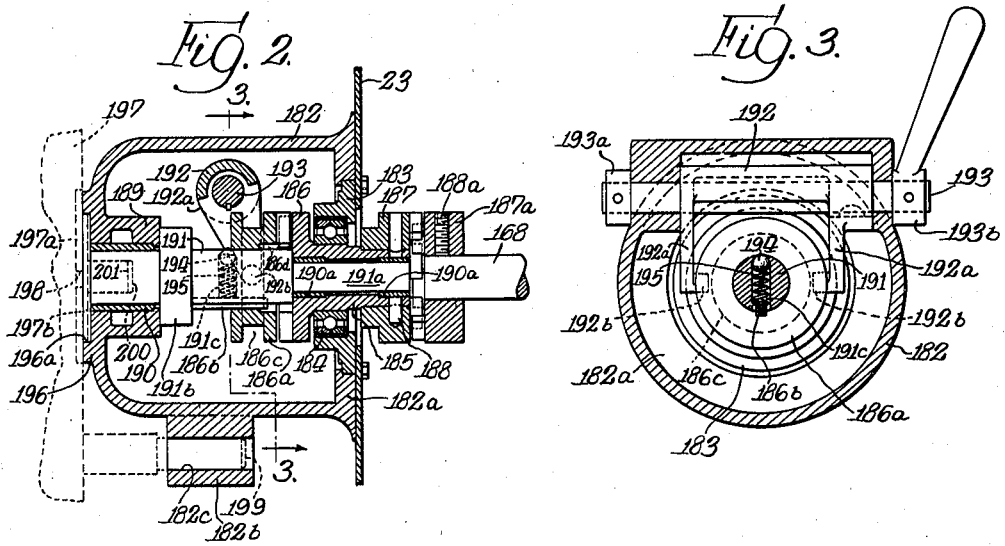
INVENTOR.
Edward J. Karp.

Patented June 15, 1943

2,321,751

UNITED STATES PATENT OFFICE 2,321,751

POWER TAKE-OFF

Edward J. Karp, Cicero, Ill., assignor to G. S. Blakeslee & Co., Cicero, Ill., a corporation of Illinois Original application April 25, 1941, Serial No. 390,229. Divided and this application July 23, 1942, Serial No. 452,064

4 Claims. (Cl. 74—11)

This invention relates to power take-offs, and has to do with means for driving various attachments from a power take-off shaft of a machine intended for use in restaurants, hotels and other establishments in the mixing and treatment of comestibles.

My invention is directed to power take-off means of the character stated in which the parts may readily be assembled and disassembled for cleaning, replacement, or repair. More specifically, I provide a housing in which the means for transmitting power from the take-off shaft to the attachment is mounted, this housing and the parts carried thereby constituting a unit readily removable as such from the machine, and in which the parts mounted in the housing may be removed therefrom and replaced therein with expedition and facility when the unit is removed from the machine. I further provide driving connections between the power take-off shaft and the parts carried by the removable and replaceable unit, such connections permitting removal and replacement of the unit without disturbing the take-off shaft, while assuring proper driving connection between the latter and the unit when the latter is mounted in its proper position on the machine, such driving connections also accommodating any slight misalignment or inaccuracies between the take-off shaft and the parts driven thereby. Also, I provide improved clutch means carried by the unit for controlling drive of the attachment from the take-off shaft. Further objects and advantages of my invention will appear from the detail description.

In the drawing:

Figure 1 is a plan view of a mixing machine, with the cover thereof removed, provided with a power take-off embodying my invention;

Figure 2 is a sectional view, on an enlarged scale, taken substantially on line 2—2 of Figure 1, showing fragmentarily and in dotted lines an attachment disposed to be driven by the take-off shaft, certain parts being shown in elevation; and Figure 3 is a sectional view taken substantially on line 3—3 of Figure 2, certain parts being shown in elevation.

This application is a division of my copending application for Mixing machine, Serial No. 390,229, filed April 25, 1941.

The mixing machine with which the power take-off of my instant invention is intended to be used is disclosed in detail in my above identified copending application, and a brief description of that machine will suffice here. It comprises a suitable base (not shown) from which extends upward a tubular column having at its upper end a housing 22 the forward portion of which provides an overhang 23 projecting forward from the front vertical wall of the column, the latter and the head being formed of sheet metal of proper thickness welded together. A transmission unit 33 is mounted in overhang 23 of head 22, on a diaphragm plate 29 welded in overhang 23. Unit 33 comprises a shaft 37 on which is secured a V-pulley 40 which receives a V-belt 41 passing about a V-pulley 42 secured on the shaft of a vertically disposed electric motor 44. Pulley 42 is of known type such that its effective radius is varied by adjustment of motor 44 toward and away from shaft 37, for varying the speed of the latter. The motor 44 is mounted on a carriage 50 slidably mounted on rods 55 and adjusted along the latter by means of a screw shaft 63 provided at its forward end with a hand wheel 71 having a handle 72. A bowl support of approximately U-shape in plan, comprising forwardly and outwardly curved arms 88, is slidably mounted on vertical rods 90 on which it is adjusted by means of a screw shaft 95. This shaft 95 is rotated in desired direction by means of a bevel gear 98 secured on the upper end thereof, meshing with a bevel gear 99 secured on a shaft 100 rotated by means of a hand wheel 103, secured on its outer end and provided with a handle 104. A mixing bowl 116 is mounted on the bowl support, beneath overhang 23 of head 22, disposed for reception of a suitable implement driven from transmission 33 for mixing or agitating the contents of bowl 116.

The transmission unit 33 is provided with a take-off shaft 168 suitably driven by shaft 37. Shaft 168 extends toward one side wall of overhang 23 of head 22, coaxially with a cylindrical housing 182 extending from the outer face of that wall and bolted thereto. Base 182a of housing 182 is suitably bored and rabbeted for reception of a bearing retainer ring 183 confined between base 182a and the wall of overhang 23. A ball bearing 184, mounted in ring 183, rotatably supports a stepped sleeve 185 provided at its outer end with an integrally formed jaw clutch member 186 the inner or rearward face of which contacts the inner race of ball bearing 184. Sleeve 185 extends inwardly of overhang 23 and has a coupling member 187 secured on its inner end, by means of a pin 188. Coupling member 187 is in engagement with a coupling member 187a secured on the outer end of shaft 168, by a set screw 188a. The members 187 and 187a establish driving connection between shaft 168 and sleeve 185 while accommodating any slight misalignment of these parts which may be present due to the plate or sheet metal construction used.

Housing 182 is provided, at its outer end, with an inwardly extending collar 189 in which is secured a bearing bushing 190 in which is mounted the outer end portion of a shaft 191 of stepped formation, the reduced inner portion 191a of which is rotatably mounted in bearing bushings 190a suitably secured in sleeve 185. The inner end of the body portion of shaft 191 abuts the outer end of sleeve 185 and a collar 191b on shaft 191, conveniently formed integrally therewith, abuts the inner end of collar 189, while the outer end of the hub of coupling member 187 abuts a shoulder on sleeve 185. Shaft 191 and sleeve 185 are thus confined against endwise movement relative to each other and to housing 182, and coupling member 187 is confined against endwise movement relative to sleeve 185.

A jaw clutch member 186a is splined on shaft 191, by means of a key 186b, for movement lengthwise thereof into and out of engagement with clutch member 186. Member 186a is provided with a circumferential groove 186c which receives studs 192b at the lower ends of arms 192a of a yoke 192 keyed on a rod 193 rotatably mounted in the upper portion of housing 182. Rod 193 is confined against endwise movement by a stop collar 193a secured on one end thereof, and a shift lever 193b secured upon its other end. By turning rod 193 in proper direction clutch member 186a may be moved into and out of engagement with clutch member 186, thus clutching and declutching shaft 191 to and from sleeve 185 as desired. It will be apparent that with the clutch member 186a in its position shown in Figure 2, shaft 191 is clutched to and driven by sleeve 185.

The bore of clutch member 186 is of increased diameter at its inner portion, to provide clearance 186d about shaft 191, the latter being provided with a diametrical bore 191c extending from the keyway therein, for key 186b, the end of bore 191c remote from key 186b tapering outward and providing an opening of reduced diameter at that side of shaft 191. A locking ball 194 normally is held seated in the tapering end portion of bore 191c, in position projecting a short distance outward beyond shaft 191, by a coil compression spring 195 disposed in bore 191c and confined between ball 194 and key 186b. When clutch member 186a is in its position shown in Figure 2, ball 194 is in contact with the outer end of the hub of member 186a and holds the latter in its engaged position, as shown. When member 186a is moved outward into its disengaged position, ball 194 is disposed at the inner end of the hub thereof, within clearance 186d, and is effective for holding member 186a in its latter position, the parts being suitably proportioned to that end, as will be understood. In the outer or declutched position of member 186a, shaft 191 is declutched from sleeve 185 which may then rotate independently thereof.

At its outer end housing 182 is provided with a boss 196 having formed therein a depression 196a concentric with shaft 191. A lug 182b depends from the lower portion of housing 182 and is provided with a lengthwise bore 182c. When take-off shaft 168 is not being used for driving an attachment, the outer end of housing 182 is closed by a cover plate 226 (Figures 1 and 2) seating upon boss 196 and suitably secured in position, conveniently by means of thumb screws 227 passing through plate 226 and screwing into boss 196. In Figure 2 I have indicated, in dotted lines, an attachment 197, such as a meat chopper, tool sharpener, fruit juice extractor, or other attachment mounted in position to be driven from the take-off shaft 168. This attachment 197 is provided with a flat element or base 197a which seats against boss 196 and carries a rearwardly extending projection 197b which fits snugly within recess 196a. Base 197a is provided, at each side thereof, with a slot 198 of proper size to receive one of the screws 227, by means of which attachment is secured in position upon housing 182. A stud 199, suitably secured to attachment 197, fits into bore 182c of lug 182b and assists screws 227 in resisting any tendency of the attachment to turn about the axis of shaft 191. The latter is provided with a squared socket 200 in its outer end, which socket receives the correspondingly shaped terminal portion 201 of the shaft or driven member of the attachment 197. It will be seen that when attachment 197 is mounted upon housing 182 in the manner stated, it has driving connection to shaft 191 and may be driven therefrom or not at will, when take-off shaft 168 is driven, by appropriate manipulation of shift lever 193b.

Diaphragm plate 29 is provided with an opening 225 disposed beneath the coupling members 187 and 187a, and the side wall of overhang 23 is provided with an opening concentric with and of somewhat greater diameter than coupling member 187, as will be clear from Figures 1 and 2. By unbolting housing 182 from the wall of overhang 23, this housing and the parts mounted therein may be removed as a unit. The bearing retainer ring 183, sleeve 185, shaft 191 and associated parts may then be removed from housing 182 as a unit assembly, through the opening in base 182a, shift rod 193 being turned in counterclockwise direction during such removal until studs 192b clear the clutch member 186a. The assembly unit is then accessible and readily may be disassembled for cleaning, repair or replacement of parts and as readily reassembled, after which it may be quickly and easily replaced within housing 182, by reversing the above operation, as will be obvious.

It will be understood that various changes in construction and arrangement of the parts of the power take-off of my invention may be resorted to without departing from the field and scope thereof, and I intend to include all such variations, as fall within the scope of the appended claims, in this application in which the preferred form only of my invention has been disclosed.

I claim:

1. In combination, a head and a transmission unit mounted therein having a take-off shaft extending therefrom toward a wall of said head, said wall having an opening therethrough, a housing removably mounted on the outer face of said wall over said opening, a driven shaft mounted in said housing substantially coaxial with said take-off shaft, a sleeve extending about said driven shaft mounted for rotation therewith and relative thereto, means for clutching and declutching said sleeve to and from said driven shaft, and means establishing driving connection between said take-off shaft and said sleeve disconnectible by endwise movement of said sleeve away from said take-off shaft.

2. In combination, a head and a transmission unit mounted therein having a take-off shaft extending toward a wall of said head, said wall having an opening therethrough, a housing removably mounted on the outer face of said wall over said opening, a driven shaft mounted in said housing substantially coaxially with said take-off shaft, a sleeve extending about said driven shaft mounted for rotation therewith and relative thereto, said sleeve extending through said opening, means for clutching and declutching said sleeve to and from said driven shaft, a coupling member secured on the outer end of said take-off shaft, and a coupling member secured on the inner end of said sleeve in driving engagement with said take-off shaft coupling member, said sleeve coupling member being of a size to pass through said opening and engageable with and disengageable from said take-off coupling member by endwise movement of said sleeve toward and away from said take-off shaft.

3. In combination, a head and a transmission unit mounted therein having a take-off shaft extending toward a wall of said head, said wall having an opening therethrough, a housing removably mounted on the outer face of said wall over said opening, said housing having an opening at its inner end, a bearing retaining ring removably mounted in said opening of said housing retained between the latter and said wall, bearing means mounted in said ring, a sleeve rotatably mounted in said bearing means restrained thereby against movement toward said take-off shaft, a driven shaft rotatably mounted in said housing and through said sleeve restrained against endwise movement away from said take-off shaft, said driven shaft and said sleeve having cooperating means restraining said sleeve against endwise movement away from said take-off shaft, said sleeve having a clutch member at its outer end, a clutch member splined on said driven shaft cooperating with said sleeve clutch member for clutching and declutching said sleeve to and from said driven shaft, said ring and driven shaft and the parts carried thereby being removable from and insertible into said housing as a unit through said opening at the inner end of said housing when the latter is removed from said head, a coupling member secured on the outer end of said take-off shaft, and a coupling member secured on the inner end of said sleeve movable through said opening in said wall and engageable with and disengageable from said take-off shaft coupling member by endwise movement of said driven shaft toward and away from said take-off shaft.

4. In combination, a head and a transmission unit mounted therein having a take-off shaft extending toward a wall of said head, said wall having an opening therethrough, a housing removably mounted on the outer face of said wall over said opening, said housing having an opening at its inner end and a bearing collar at its outer end, a bearing retaining ring removably mounted in said opening of said housing retained between the latter and said wall, bearing means mounted in said ring, a sleeve rotatably mounted in said bearing means restrained thereby against movement toward said take-off shaft and having at its outer end a clutch member, a driven shaft rotatably mounted in said collar and through said sleeve having shoulders abutting the inner end of said collar and the outer end of said sleeve, a clutch member splined on said driven shaft cooperating with said sleeve clutch member for clutching and declutching said sleeve to and from said driven shaft, said ring and driven shaft and the parts carried thereby being removable from and insertible into said housing as a unit through said opening at the inner end of said housing when the latter is removed from said head, a coupling member secured on the outer end of said take-off shaft, and a coupling member secured on the inner end of said sleeve movable through said opening in said wall and engageable with and disengageable from said take-off shaft coupling member by endwise movement of said driven shaft toward and away from said take-off shaft.

EDWARD J. KARP.